March 30, 1965   E. RUCHSER   3,175,659
CONTROL MECHANISM FOR PRESSES
Filed Aug. 29, 1961   3 Sheets-Sheet 1

INVENTOR
Erich Ruchser

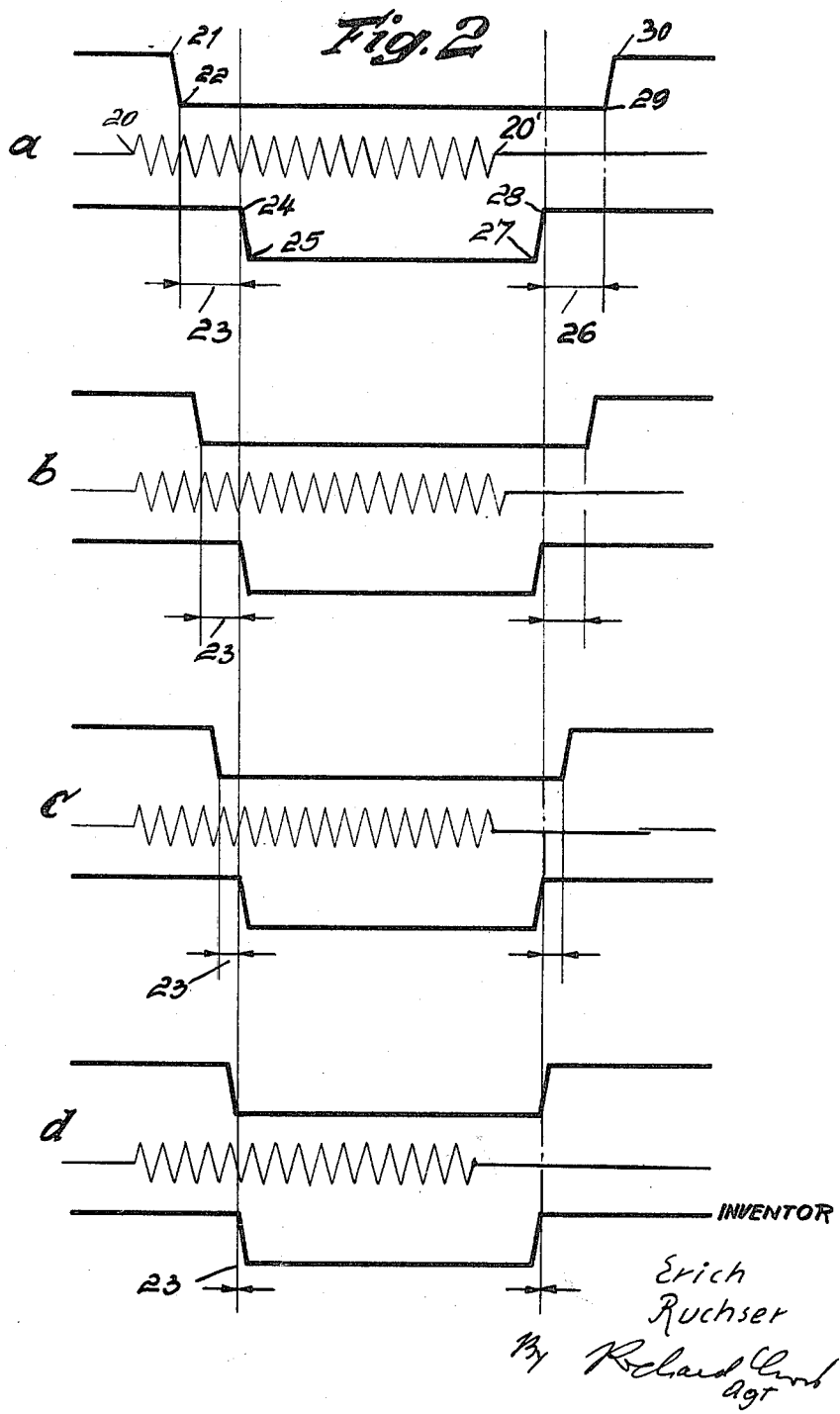

March 30, 1965  E. RUCHSER  3,175,659
CONTROL MECHANISM FOR PRESSES
Filed Aug. 29, 1961  3 Sheets-Sheet 3
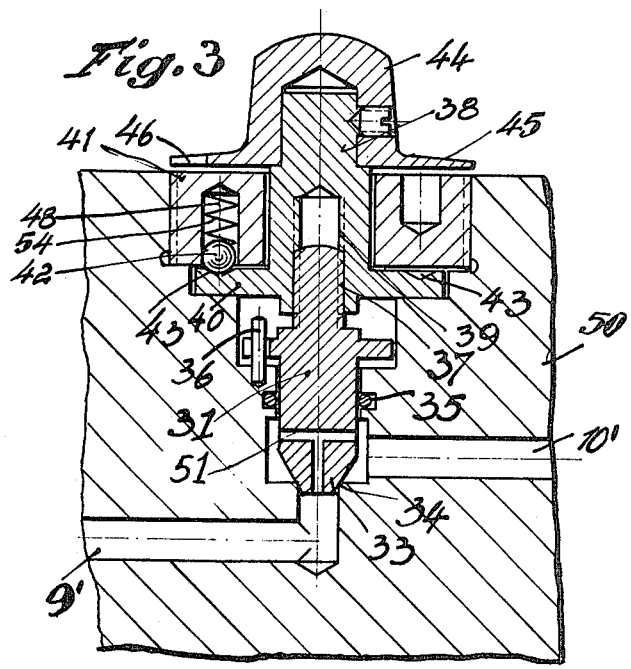
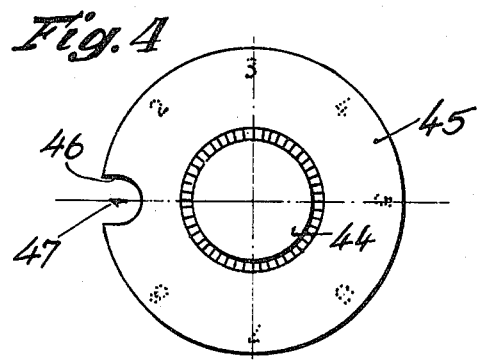
INVENTOR
Erich Ruchser
By Richard Low
Agt

United States Patent Office 3,175,659
Patented Mar. 30, 1965

3,175,659
CONTROL MECHANISM FOR PRESSES
Erich Ruchser, Rommelshausen, Wurttemberg, Germany, assignor to Erich Herion, Stuttgart-Frauenkopf, Wurttemberg, Germany
Filed Aug. 29, 1961, Ser. No. 134,769
Claims priority, application Germany, Oct. 22, 1960, H 40,743
14 Claims. (Cl. 192—12)

The present invention relates to a control mechanism for the clutch and brake of a machine such as a press operated by hydraulic or pneumatic pressure, and it is the general object of the invention to provide an improved control mechanism which comprises at least one separate control valve for the clutch and for the brake, and means for operating these two or more valves simultaneously by the provision of a single servo circuit even though the timing required for the operation of the brake may differ from that which is required for the operation of the clutch.

It is a more specific object of the invention to provide a press control mechanism of the above-mentioned type which is designed so as to insure that, when the brake and clutch are operated simultaneously, a delay will occur between the release of the clutch and the engagement of the brake or vice versa so that any overlapping of these operations will be absolutely prevented.

It is a particular object of the invention to insure that the operations of a brake and clutch of a press will occur within a certain delay range, that the maximum and minimum limits of this range will always be maintained, and that any overlapping of the respective operations will be avoided with certainty without requiring the press operator to carry out any difficult manual adjustments and even without enabling him to carry out adjustments outside the preset limits of the delay range.

The above-mentioned objects are attained according to the invention in an arrangement including conventional flow reversing valves which are operated indirectly by solenoid-controlled pilot valves installed in an auxiliary or servo circuit. The latter circuit is branched off the main pressure circuit leading to the flow reversing valves and through the latter to the brake and clutch of the press. These objects are further attained by the combination and cooperation of the mentioned flow reversing and pilot valves with a throttling valve of a particular design in the line of the servo circuit leading to the brake valve and a similar throttling valve in the discharge line of the servo circuit coming from the clutch valve. These two throttling valves are designed in accordance with the different capacities of the brake and clutch and comprise fixed nozzles or nozzle openings which are made of a size in accordance with the smallest admissible delay between the respective operations of the brake and clutch. In order to permit an adjustment of the delay without any possibility of an overlapping of the respective operations, the two throttle valves are provided at the outside with symbols, for example, numerals, which correspond to certain nozzle openings and may be read by the press operator without revealing to him the actual nozzle sizes which are preset for the brake and clutch.

According to one embodiment of the invention, each of these throttling valves is provided with a rotatable tubular valve member having several different nozzle openings selectively alignable with an opening in the valve housing. The nozzle openings are associated with corresponding indications on an outer control knob for indicating the respective delay periods. The largest bore is made of a size so as to correspond to the shortest delay period which will not cause overlapping of the brake and clutch operations.

The respective cross sectional areas of the bores within each throttling valve, and particularly the area of the largest bore, are determined experimentally. The smallest admissible delay period should be, $\frac{1}{10,000}$ sec. without any overlapping of the brake and clutch operations, while the smallest bore should result in a delay period of, for example, $\frac{1}{500}$ sec.

The control mechanism of the invention permits the movement of the press ram after the press is switched off to be limited to a much shorter distance, the wear on the clutch and especially on the brake to be reduced, and the safety of operation of the press and the length of its useful life to be increased as compared to conventional devices.

According to an additional feature of the invention the throttle valves may be arranged in such a manner that the greatest and smallest permissible flow rates of the pressure medium to or from the pilot valves are fixed and that intermediate flow rates may be set by, an infinitely variable adjustment. The fixed setting of the smallest nozzle opening is important for avoiding undesirable movement of the press ram after the press is switched off.

The valve construction according to the invention prevents errors in adjustment which might exceed the maximum and minimum periods of the delay between the respective operations of the clutch and brake. A number of fixed intermediate positions on both throttle valves may be associated with each other.

The above-mentioned objects, features, and advantages of the present invention will become more clearly apparent from the following detailed description thereof which is to be read with reference to the accompanying drawings, in which—

FIGURE 2 shows four different control diagrams a to d of the apparatus according to FIGURE 1;

Figure 1:
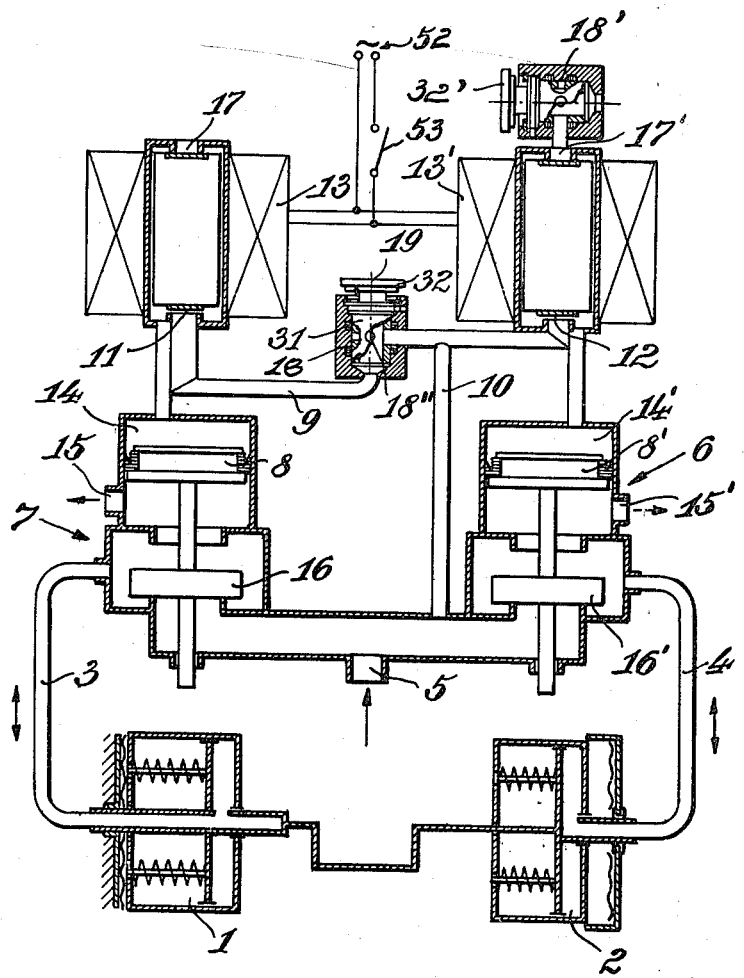
FIGURE 1 is a partly diagrammatic cross-sectional view of an apparatus according to the invention.
Figure 1A:
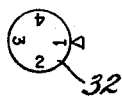
FIGURE 1A shows a detail of the apparatus of FIGURE 1 in plan view.

FIGURE 3 shows a modified throttling valve for use in the apparatus according to FIGURE 1, the view being in elevational section; while FIGURE 4 shows a detail of the valve of FIGURE 3 in plan view In the drawings, 1 indicates the brake of a press drive and 2 the clutch thereof. They are connected by the lines 3 and 4 through the two flow reversing valves 6 and 7 to the main pressure line 5 for a pressure medium.

The two reversing valves 6 and 7 are identical, each being operated by means of a piston 8, 8' fixedly connected to a valve member 16, 16'. The piston is actuated by pressure medium admitted through an auxiliary circuit 9 or 10, respectively, which branches off the main pressure line and is controlled by an auxiliary or pilot solenoid valve 11 or 12.

The solenoids 13, 13' of the valves 11, 12 are connected to a source of current 52 through a switch 53. The solenoids are switched on or off together, and therefore the brake valve 7 and the clutch valve 6 are also operated simultaneously by their respective actuating pistons 8, 8'.

In the position of the apparatus as illustrated in FIGURE 1, the solenoid windings 13, 13' are not energized. The pilot valves 11 and 12 are held open by the pressure in the main pressure line 5, or by means of non-illustrated conventional return springs. The pressure in the cylinder chambers 14, 14' of valves 6 and 7 then pushes the pistons and valve members downwardly to block admission of pressure fluid from the pressure line 5. The two outlets 15, 15' of the valves 6, 7 which are open to the atmosphere are connected to the brake and clutch. When the two solenoid windings 13, 13' are energized, the auxiliary or pilot valves 11 and 12 which form the solenoid armatures are moved so that discharge outlets, 17, 17' are connected with the cylinder chambers 14, 14' to vent the same while admission of pressure medium through the circuits 9, 10 is blocked. The clutch and the brake are connected to the pressure line since the valve pistons 8, 8' are urged by the back pressure in line 5 toward their operative positions. The brake 1 is then placed under pressure and is thus immediately released, while the clutch 2 is only subsequently engaged since the pressure release from the associated cylinder chamber 14' is delayed as will presently become apparent.

In order to control the timing of valve operation, a throttle valve 18 is provided in the line 9 leading to the auxiliary valve 11. This throttle valve 18 is designed for the smallest admissible delay in the actuation of the brake. It is provided at the outside with four setting marks 19 on the control knob 32 of a tubular valve member 31. The valve member 31 is rotatable in the corresponding housing and is provided on its periphery with four different nozzle openings 13. The outlet 17' of the solenoid valve for the clutch 2 is provided with a similar valve 18' which also has nozzle openings of different sizes. The control knob 32' of this valve 18' is provided with the same setting marks as the control knob 32, namely the numerals 1 to 4, so that, if a certain delay is required in the operation of the press, it is only necessary to adjust each valve 18 and 18' to the desired setting of, for example, 2, whereupon the same delay will always be attained by both valves. If the maximum nozzle opening is set for an admissible delay of, for example, 0, and the smallest nozzle opening is set for the longest admissible delay, it is impossible to deviate intentionally or unintentionally from the predetermined delay range, so that no overlapping of the operations of the clutch and brake can occur, nor any change in the distance of the movement of the press ram subsequent to the time when the press control is switched off.

If the switch 53 is closed for simultaneous operation of the solenoids 13, 13' the brake 1 will be immediately released since the outlet 17 is entirely open. The clutch 2, however, cannot be simultaneously engaged since the pressure medium can escape from chamber 14' only at a certain delay. When the switch 53 is opened, the reverse procedure occurs.

The control diagrams a to d in FIGURE 2 illustrate how accurately the apparatus according to the invention will work if the brake valve and the clutch valve are both provided with throttle valves which are accurately fixed and accurately coordinated. The actual sizes of the respective nozzle openings do not have to be known to the press operator. It suffices if their association with each other in accordance with the capacity of the clutch and brake is marked on the outside of the throttle valves 18, 18' by corresponding symbols. Thus, for example, the two solenoids may be switched on at 20, while at 20' they should be switched off. If they are switched on at the point 20, the brake will begin to release at the point 21 and will be released at 22. The further distance 23 then constitutes the proper, accurately maintained delay of clutch operation in accordance with the selected size of the nozzle openings. The clutch does not start to engage until the point 24 is reached and it is fully engaged at the point 25. This delay between the brake and clutch operations in accordance with the smallest nozzle opening will be maintained without any danger of overlapping between them.

When the press control is switched off, the clutch will start to disengage at the point 27 and will be fully disengaged at the point 28, while the delay 26 will again be accurately maintained as the period of the delay since the brake does not start to engage until the point 29 is reached and will be fully engaged at the point 30. The diagrams b to d indicate the delay periods 23 for larger nozzle openings up to the maximum size which is still admissible for a delay of 0.

FIGS. 3 and 4 illustrate a modified embodiment of a throttling valve according to the invention which comprises a valve housing 50 which has an inlet aperture 10' and outlet aperture 9' for the servo medium actuating the auxiliary or pilot valves as shown in FIGURE 1.

The valve member 31 is provided according to the invention with a restricted valve channel or passage 51 of a fixed aperture size which corresponds to the smallest permissible delay between the operations of the two reversing valves. Valve member 31 also has on its end a sealing surface 33 which permits it to be tightly closed on a valve seat 34 in housing 50. Valve member 31 which is sealed by a packing 35 is slidably mounted in the longitudinal direction within housing 50 on a guide pin 36 and it is provided at its upper end with a threaded stem 37 which is screwed into a corresponding inner thread 39 on a setting member 38 so that, when the setting member 38 is turned, valve member 31 will be shifted in an axial direction relative to its seat 34. In this manner it is possible to increase the flow of the pressure medium beyond a minimum flow rate which is determined by the flow section of the fixed valve channel 51.

The setting member 38 is provided with a disklike projection 40 which may be locked in different positions relative to a removable insert 41 in the housing 50. For this purpose, the disklike projection 40 is provided with a number of circumferentially spaced recesses 43 into which balls 42 in sockets 48 of the insert 41 are adapted to engage under the pressure of springs 54. These locking balls 42 in association with the disklike projection 40 permit the valve member 31 to be releasably arrested in a relatively large number of intermediate axial positions. Since the disklike member 40 may be made of considerable size, the individual locking positions may be fixed thereon quite accurately.

The setting member 38 is provided with a control knob 44 with a disk-shaped part 45 thereon which has an aperture 46 in its outer edge through which, in accordance with the respective position of knob 44, one of several setting symbols 47, for example, numerals or letters, may be seen which are marked on the housing insert 41 (FIG. 4).

The apparatus according to FIGURE 3 when connected to the inlet or outlet line for the servo medium of the auxiliary valves, insures by an adjustment of control knob 44, for example, to the position 1, as indicated in FIGURE 4, that the longest admissible delay period can no longer be exceeded and that at any intermediate position to which the control knobs 44 of the two valves might be adjusted, also the smallest admissible delay period cannot be reduced when valve members 31 are fully opened, and it further permits to set up any desired intermediate positions in accordance with the locking positions and the symbols 47 without any danger that the operations of the clutch and brake might ever overlap.

Although the embodiment of the invention as described above concerns a press control in which the brake and the clutch are each actuated by a separate flow reversing valve, it is also possible to apply the concept of the invention to such press controls in which the brake and the clutch are each controlled by a separate double valve in a parallel connection. In such a case it is necessary that the double valve for the brake as well as that for the clutch is each provided with a corresponding throttling valve in its associated double auxiliary servo circuit.

Although my invention has been illustrated and described with reference to preferred embodiments thereof, I wish to have it understood that it is in no way limited to the details of such embodiments, but is capable of numerous modifications within the scope of the appended claims.

Having thus fully disclosed my invention, what I claim is:

1. A control mechanism for a fluid pressure operated apparatus including a clutch and a brake actuated by said pressure, the mechanism comprising, in combination:
   (a) a source of pressure fluid;
   (b) two flow reversing valve means connected to said source and adapted to be connected to said clutch and to said brake respectively for admitting fluid from said source to said clutch and said brake when said valve means are in respective operative positions thereof, and for venting said clutch and said brake when said valve means are in respective inoperative positions;
   (c) two fluid-pressure operated actuating means for respectively moving said reversing valve means between said positions thereof;
   (d) two pilot valve means respectively interposed between said source and said actuating means, said pilot valve means being movable between respective first and second positions, each pilot valve means in the first position thereof connecting said source to an associated respective actuating means for flow of pressure fluid in a first path from said source through said pilot valve means to said associated actuating means in a first path, and each pilot valve means in the second position thereof venting said associated actuating means for flow of pressure fluid away from said actuating means through said pilot valve means in a second path;
   (e) throttle means in at least one of said paths; and
   (f) means for simultaneously moving said two pilot valve means between said first and second positions thereof.

2. A mechanism as set forth in claim 1, wherein said throttle means include a first throttle member arranged in the first path through one of said pilot valve means, and a second throttle member arranged in the second path through the other pilot valve means.

3. A mechanism as set forth in claim 2, wherein said first and second throttle members are each adjustable between a predetermined position of maximum fluid flow and a predetermined position of minimum fluid flow, said mechanism further including means for preventing the closing of the respective paths by said throttle members in the position of minimum fluid flow.

4. A mechanism as set forth in claim 1, wherein said throttle means includes two throttle members arranged in respective ones of said paths, said mechanism further comprising means for moving each of said throttle members between two terminal positions, said pressure fluid flowing in the respective paths at a lower rate of flow when the corresponding throttle member is in one of said terminal positions thereof, and at a higher rate of flow when said corresponding throttle member is in the other terminal position thereof.

5. A mechanism as set forth in claim 1, wherein said means for simultaneously moving said pilot valve means include solenoid means.

6. A mechanism as set forth in claim 1, wherein said throttle means include a throttling valve having a housing formed with two normally connected apertures communicating with respective portions of said one path, a valve seat on one of said apertures, a valve member movable in said housing toward and away from a sealing position in which said valve member sealingly engages said valve seat and seals said one aperture, said valve member being formed with a restricted passage therethrough for connecting said apertures when said valve member is in said sealing position, and moving means for moving said valve member toward and away from said sealing position.

7. A mechanism as set forth in claim 1, wherein said throttle means include a valve housing having two apertures communicating with respective portions of said one path, and a valve member formed with a plurality of passages therethrough, said valve member being movable in said housing between a plurality of positions in which respective ones of said passages selectively connect said apertures, at least two of said passages differing from each other in effective cross sectional flow area.

8. A mechanism as set forth in claim 7, further comprising manually operable moving means extending outside said housing for moving said valve member between said positions thereof.

9. A mechanism as set forth in claim 8, wherein said moving means is rotatably mounted on said housing, said mechanism further comprising indicia means on said moving means and on said housing for indicating the angular position of said moving means.

10. A mechanism as set forth in claim 6, further comprising releasable means for arresting said valve member in a plurality of positions spaced from each other and from said sealing position.

11. A mechanism as set forth in claim 6, wherein said moving means include a manually rotatable setting member mounted on said housing and threadedly engaging said valve member, and guide means for preventing rotation of said valve member.

12. A mechanism as set forth in claim 11, further comprising releasable arresting means for arresting rotation of said manually rotatable member in a plurality of angularly spaced predetermined positions.

13. A mechanism as set forth in claim 12, wherein said arresting means include a locking member movable on said housing toward and away from said rotatable member, the latter member being formed with a plurality of recesses angularly spaced about the axis of rotation thereof and alternatively engageable by said locking member, and resilient means permanently urging said locking member toward a position of engagement with said recesses.

14. A mechanism as set forth in claim 11, further comprising indicia means on said housing and said rotatable member for indicating the angular position of said rotatable member.

References Cited by the Examiner

UNITED STATES PATENTS

| | | | |
|---|---|---|---|
| 2,065,820 | 12/36 | Mellon | 192—144 |
| 2,577,882 | 12/51 | Foster | 192—144 |
| 2,706,026 | 4/55 | Georgeff. | |
| 2,794,523 | 6/57 | Cortelli et al. | 192—144 X |
| 2,983,348 | 5/61 | Ott. | |

DAVID J. WILLIAMOWSKY, *Primary Examiner.*